United States Patent
Ansari et al.

(10) Patent No.: US 11,252,759 B2
(45) Date of Patent: Feb. 15, 2022

(54) RECONFIGURATION OF LISTEN-AFTER-TALK PROCEDURE

(71) Applicant: TELEFONAKTIEBOLAGET LM ERICSSON (PUBL), Stockholm (SE)

(72) Inventors: Junaid Ansari, Fürth (DE); Gen Li, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 358 days.

(21) Appl. No.: 16/487,692

(22) PCT Filed: Feb. 21, 2017

(86) PCT No.: PCT/CN2017/074210
§ 371 (c)(1),
(2) Date: Aug. 21, 2019

(87) PCT Pub. No.: WO2018/152671
PCT Pub. Date: Aug. 30, 2018

(65) Prior Publication Data
US 2021/0289551 A1    Sep. 16, 2021

(51) Int. Cl.
*H04W 74/08* (2009.01)
*H04L 1/18* (2006.01)
*H04W 74/00* (2009.01)

(52) U.S. Cl.
CPC ....... *H04W 74/0816* (2013.01); *H04L 1/1896* (2013.01); *H04W 74/008* (2013.01)

(58) Field of Classification Search
None
See application file for complete search history.

(56) References Cited

U.S. PATENT DOCUMENTS

| | | |
|---|---|---|
| 2016/0066208 A1 | 3/2016 | Baron et al. |
| 2017/0208624 A1 | 7/2017 | Zhang et al. |
| 2018/0152851 A1 | 5/2018 | Li et al. |

FOREIGN PATENT DOCUMENTS

| | | |
|---|---|---|
| CN | 106304386 A | 1/2017 |
| WO | 2016197315 A1 | 12/2016 |
| WO | 2816197315 A1 | 12/2016 |
| WO | 2017024520 A1 | 2/2017 |

OTHER PUBLICATIONS

Yücek et al., "A survey of spectrum sensing algorithms for cognitive radio applications", IEEE Communications Surveys and Tutorials, 2009, vol. 11, No. 1, pp. 116-130, Quat.
Jian Luo et al., "Preliminary radio interface concepts for mm-wave mobile communications, Millimetre-Wave Based Mobile Radio Access, Network for Fifth Generation Integrated. Communications (mmMAGIC)," Jul. 7, 2016, XP855483366.

*Primary Examiner* — James P Duffy
(74) *Attorney, Agent, or Firm* — Withrow & Terranova, PLLC

(57) ABSTRACT

Methods and apparatuses are provided for controlling a listen-after-talk (LAT) procedure in a wireless communication network comprising at least a source node (SN) and a destination node (DN). Such methods or apparatuses may obtain information indicating an operational context of the LAT procedure, adapt at least one parameter of the LAT procedure according to the obtained information, and control at least the SN or the DN to communicate according to the LAT procedure having the adapted at least one parameter.

20 Claims, 17 Drawing Sheets

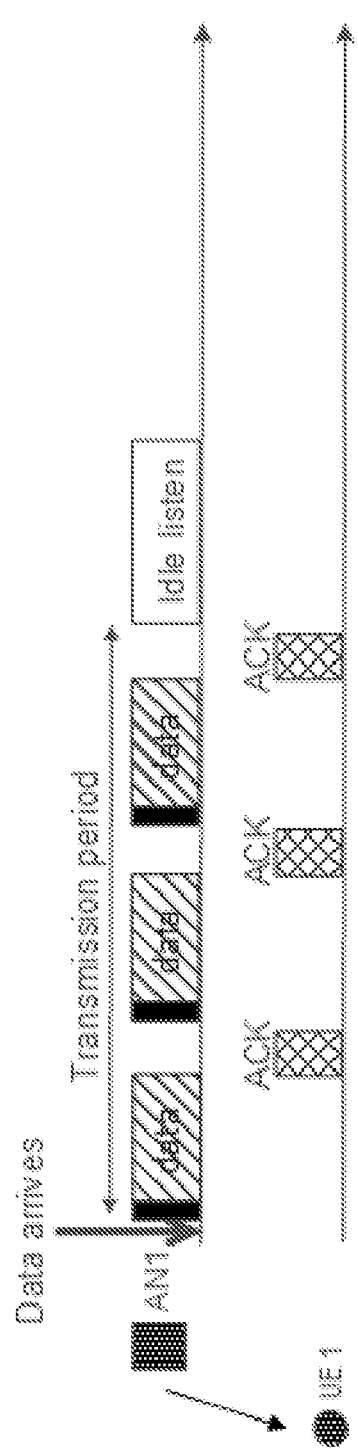
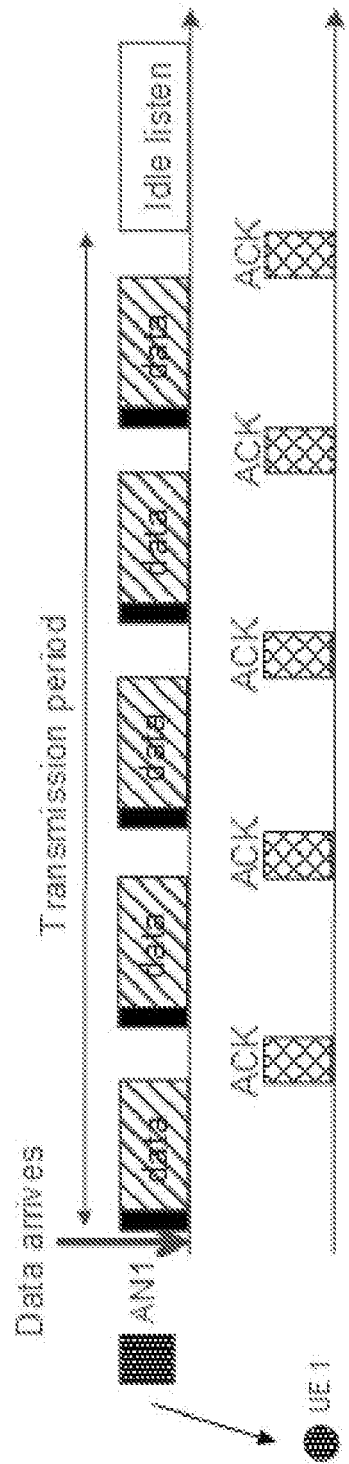
FIG. 6A
FIG. 6B

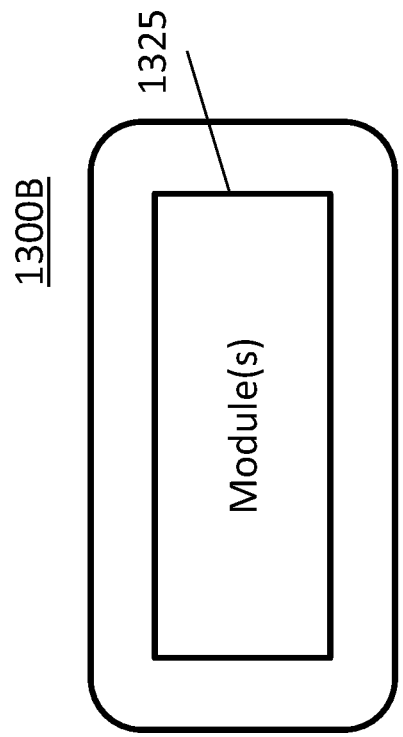
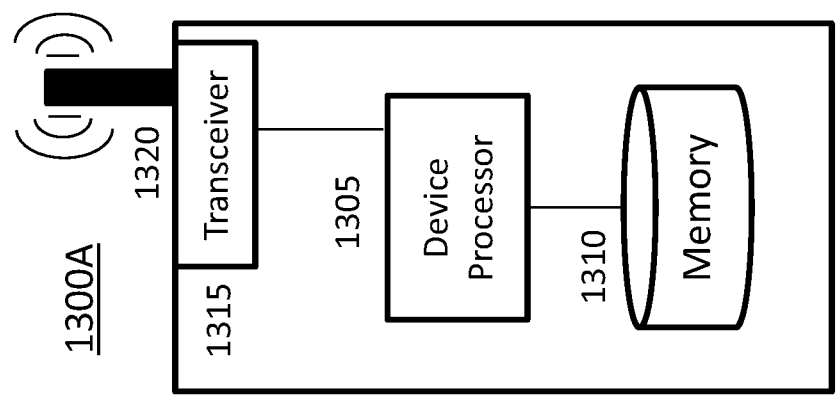
FIG. 13B
FIG. 13A

RECONFIGURATION OF LISTEN-AFTER-TALK PROCEDURE

RELATED APPLICATIONS

This application is a national stage application of International Patent Application No. PCT/CN2017/074210, filed Feb. 21, 2017, the disclosures of which is hereby incorporated herein by reference in its entirety.

TECHNICAL FIELD

The disclosed subject matter relates generally to telecommunications. Certain embodiments relate more particularly to concepts such as listen-before-talk (LBT), listen-after-talk (LAT), reconfiguration and adaptation, medium access, contention based access, parameter selection, and radio resource optimization.

BACKGROUND

Mobile broadband will continue to drive demands for high overall traffic capacity and high achievable end-user data rates in wireless access networks. Several use-cases and deployment scenarios in future will require data rates of up to 10 Gbps. These demands for very high system capacity and very high end-user data rates can be met by networks with distances between access nodes ranging from a few meters in indoor deployments to roughly 50 m in outdoor deployments, i.e., with an infrastructure density considerably higher than most dense networks of today.

The wide transmission bandwidths needed to provide data rates of up to 10 Gbps and above can likely only be obtained from spectrum allocations in the centimeter and millimeter-wave bands. High-gain beamforming, typically realized with array antennas, can be used to mitigate the increased pathloss at high frequencies, and benefit from spatial reuse and multi-user schemes. We refer to such networks as New Radio (NR) in the following description.

Besides traditional licensed exclusive bands, NR is expected to operate in unlicensed bands and license-shared bands especially for enterprise deployment scenarios. Thus, coexistence support is needed to enable efficient spectrum sharing among different operators and/or other systems. Listen-Before-Talk (LBT) is a flexible way to achieve this objective. LBT is a distributed mechanism so that there is no need to exchange information between different coexisting systems.

Load-Based Clear Channel Assessment in Europe Regulation EN 301.893

For a device not utilizing the Wi-Fi protocol, EN 301.893, v. 1.7.1 provides the following requirements and minimum behavior for load-based clear channel assessment.

(1) Before a transmission or a burst of transmissions on an Operating Channel, the device shall perform a Clear Channel Assessment (CCA) check using "energy detect". The device shall observe the Operating Channel(s) for the duration of the CCA observation time which shall be not less than 20 μs. The CCA observation time used by the device shall be declared by the manufacturer. The Operating Channel shall be considered occupied if the energy level in the channel exceeds the threshold corresponding to the power level given in (5) below. If the device finds the channel to be clear, it may transmit immediately (see (3) below).

(2) If the device finds an Operating Channel occupied, it shall not transmit in that channel. The device shall perform an Extended CCA check in which the Operating Channel is observed for the duration of a random factor N multiplied by the CCA observation time. N defines the number of clear idle slots resulting in a total Idle Period that needs to be observed before initiation of the transmission. The value of N shall be randomly selected in the range 1 . . . q every time an Extended CCA is required and the value stored in a counter. The value of q is selected by the manufacturer in the range 4 . . . 32. This selected value shall be declared by the manufacturer (please see clause 5.3.1 q)). The counter is decremented every time a CCA slot is considered to be "unoccupied". When the counter reaches zero, the device may transmit.

(3) The total time that a device makes use of an Operating Channel is the Maximum Channel Occupancy Time which shall be less than (13/32)×q ms, with q as defined in (2) above, after which the device shall perform the Extended CCA described in (2) above.

(4) The device, upon correct reception of a packet which was intended for this equipment, can skip CCA and immediately proceed with the transmission of management and control frames (e.g. ACK and Block ACK frames). A consecutive sequence of transmissions by the equipment, without it performing a new CCA, shall not exceed the Maximum Channel Occupancy Time as defined in (3) above.

(5) The energy detection threshold for the CCA shall be proportional to the maximum transmit power (PH) of the transmitter: for a 23 dBm Equivalent Isotropically Radiated Power (EIRP) transmitter the CCA threshold level (TL) shall be equal or lower than −73 dBm/MHz at the input to the receiver (assuming a 0 dBi receive antenna). For other transmit power levels, the CCA threshold level TL shall be calculated using the formula: TL=−73 dBm/MHz+23−PH (assuming a 0 dBi receive antenna and PH specified in dBm EIRP).

An example to illustrate the EN 301.893 is provided in Figure (FIG. 1.

To meet regulatory requirements in the 5 GHz unlicensed spectrum, Wi-Fi and LTE License Assisted Access (LAA) use LBT as described below.

Listen-Before-Talk for Wi-Fi Systems

In typical deployments of WLAN, carrier sense multiple access with collision avoidance (CSMA/CA) is used for medium access. This means that the channel is sensed to perform a clear channel assessment (CCA), and a transmission is initiated only if the channel is declared as idle. In case the channel is declared as busy, the transmission is deferred until the channel is deemed to be idle. When the range of several access points (APs) using the same frequency overlap, this means that all transmissions related to one AP might be deferred in case a transmission on the same frequency to or from another AP which is within range can be detected. Effectively, this means that if several APs are within range, they will have to share the channel in time, and the throughput for the individual APs may be severely degraded compared to their isolated deployments. A general illustration of LBT in Wi-Fi is shown in FIG. 2.

Referring to LBT in Wi-Fi, after a Wi-Fi station A transmits a data frame to a station B, station B shall transmit the ACK frame back to station A with a delay of 16 μs. Such an ACK frame is transmitted by station B without performing the LBT operation. To prevent another station interfering with such an ACK frame transmission, a station shall defer for a duration of 34 μs (referred to as DIFS) after the channel is observed to be occupied before a subsequent attempt to assess again whether or not the channel is occupied.

Therefore, a station that wishes to transmit first performs a CCA by sensing the medium for a fixed duration DIFS. If the medium is found to be idle, the station assumes that it may take ownership of the medium and begin a frame exchange sequence. If the medium is busy, the station waits for the medium to go idle, defers for DIFS, and waits for a further random back off period.

To further prevent a station from occupying the channel continuously and thereby prevent other stations from accessing the channel, it is required for a station wishing to transmit again after a transmission is completed to perform a random back off.

Point coordination function (PCF) Interframe Space (PIFS) is used to gain priority access to the medium, and is shorter than the DIFS duration. Among other cases, it can be used by STAs operating under PCF, to transmit Beacon Frames with priority. At the nominal beginning of each Contention-Free Period (CFP), the PC shall sense the medium. When the medium is determined to be idle for one PIFS period (generally 25 μs), the PC shall transmit a Beacon frame containing the CF Parameter Set element and a delivery traffic indication message element.

The widely used Wi-Fi systems based on IEEE 802.11g/n/ac standards operate in lower frequencies (2.4 and 5 GHz frequencies) compared to the centimeter and millimeter wave frequencies, and listen and talk operations, i.e., sensing, reception and transmission are predominantly omnidirectional. The key objective of listen-before-talk is to avoid interference between simultaneous data transmission. Practical application results show that this works well in this case.

Listen-Before-Talk for LAA Systems

The eNB may transmit a transmission including physical downlink shared channel (PDSCH) on a channel on which LAA Scell(s) transmission(s) are performed, after first sensing the channel to be idle during the slot durations of a defer duration $T_d$; and after the counter N is zero in step 4. The counter N is adjusted by sensing the channel for additional slot duration(s) according to the steps below:

1) Set N=$N_{init}$, where $N_{init}$, is a random number uniformly distributed between 0 and $CW_p$, and go to step 4;
2) If N>0 and the eNB chooses to decrement the counter, set N=N−1;
3) Sense the channel for an additional slot duration, and if the additional slot duration is idle, go to step 4; else, go to step 5;
4) If N=0, stop; else, go to step 2.
5) Sense the channel during the slot durations of an additional defer duration $T_d$;
6) If the channel is sensed to be idle during the slot durations of the additional defer duration $T_d$, go to step 2; else, go to step 5;

If an eNB has not finished a transmission including PDSCH on a channel on which LAA Scell(s) transmission(s) are performed after step 4 in the procedure above, the eNB may transmit a transmission including PDSCH on the channel, after sensing the channel to be idle at least in the slot durations of an additional defer duration $T_d$.

The defer duration $T_d$ includes a duration 16 us≤$T_f$≤16 us+$T_s$ immediately followed by consecutive slot durations where each slot duration is 9 us≤$T_{sl}$≤9 us+$T_s$, and $T_f$ includes an idle slot duration $T_{sl}$ at start of $T_f$;

A slot duration $T_{sl}$ is considered to be idle if the eNB senses the channel during the slot duration, and the power detected by the eNB for at least 4 us within the slot duration is less than energy detection threshold $X_{Thresh}$. Otherwise, the slot duration is considered to be busy.

$CW_{min,p}$≤$CW_p$≤$CW_{max,p}$ is the contention window.

$CW_{min,p}$ and $CW_{max,p}$ are chosen before step 1 of the procedure above.

$m_p$, $CW_{min,p}$, and $CW_{max,p}$ are based on channel access priority class associated with the eNB transmission, as shown in Table 1.

If the eNB transmits discovery signal transmission(s) not including PDSCH when N>0 in the procedure above, the eNB shall not decrement N during the slot duration(s) overlapping with discovery signal transmission.

The eNB shall not continuously transmit on a channel on which the LAA Scell(s) transmission(s) are performed, for a period exceeding $T_{m\_cot,p}$ as shown in Table 1.

For p=3 and p=4, if the absence of any other technology sharing the carrier can be guaranteed on a long term basis (e.g. by level of regulation), $T_{m\_cot,p}$=10 ms, otherwise, $T_{m\_cot,p}$=8 ms.

TABLE 1

Channel Access Priority Class

| Channel Access Priority Class (p) | $m_p$ | $CW_{min, p}$ | $CW_{max, p}$ | $T_{m\ cot,\ p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

SUMMARY

In some embodiments of the disclosed subject matter, a method is provided for controlling an LAT procedure in a wireless communication network comprising at least a source node (SN) and a destination node (DN). The method comprises obtaining information indicating an operational context of the LAT procedure, adapting at least one parameter of the LAT procedure according to the obtained information, and controlling at least the SN or the DN to communicate according to the LAT procedure having the adapted at least one parameter.

In certain related embodiments, the operational context of the LAT procedure comprises at least one of a condition of a communication medium, traffic characteristics, a network topology, and past behavior of the LAT procedure.

In certain related embodiments, adapting the at least one parameter of the LAT procedure comprises adjusting a duration of a listening period to be employed by the SN after a transmission period. Such adjusting of the duration of the listening period may comprise e.g. increasing the listening period in consideration of relatively narrow beamwidth transmissions or relatively low channel contention, and decreasing the listening period in consideration of relatively wide beamwidth transmissions or relatively high channel contention.

In certain related embodiments, adapting the at least one parameter of the LAT procedure comprises adjusting a data frame size to be used for transmissions by the SN.

In certain related embodiments, adapting the at least one parameter of the LAT procedure comprises adjusting a transmission period to be used for transmissions by the SN.

In certain related embodiments, adapting the at least one parameter of the LAT procedure comprises adjusting a number of data frames to be transmitted by the SN during a transmission period.

In certain related embodiments, adapting the at least one parameter of the LAT procedure comprises adjusting a number of data frames to be transmitted per acknowledgement (ACK) frame.

In certain related embodiments, the information indicating the operational context of the LAT procedure comprises a metric determined by a weighted sum of factors including at least one of a condition of a communication medium, traffic characteristics, a network topology, and past behavior of the LAT procedure. In some such embodiments, the method may further comprise determining whether the metric exceeds a predetermined threshold, and adapting the at least one parameter of the LAT procedure according to the obtained information, as a consequence of whether the metric exceeds the predetermined threshold. The factors may include e.g. the past behavior of the LAT procedure, as indicated by a prior value of the metric.

The above methods, or portions or combinations thereof, may be performed by the SN, the DN, or some other node in the wireless communication network. Any of these nodes could include, e.g., an eNodeB, a UE or some other form of node. Moreover, the features of the described methods may be combined in any conceivable way within the corresponding apparatuses.

In some embodiments, an apparatus may comprise features for performing any of the above methods, or portions or combinations thereof. As an example, an apparatus such as a UE or network node may comprise processing circuitry and memory collectively configured to obtain information indicating an operational context of the LAT procedure, adapt at least one parameter of the LAT procedure according to the obtained information, and control at least the SN or the DN to communicate according to the LAT procedure having the adapted at least one parameter. Similarly, an apparatus could comprise modules such as an obtaining module configured to obtain information indicating an operational context of the LAT procedure, an adapting module configured to adapt at least one parameter of the LAT procedure according to the obtained information, and a control module configured to control at least the SN or the DN to communicate according to the LAT procedure having the adapted at least one parameter.

BRIEF DESCRIPTION OF THE DRAWINGS

The drawings illustrate selected embodiments of the disclosed subject matter. In the drawings, like reference labels denote like features.

FIG. 6A illustrates a first size of transmission period for an LAT procedure according to an embodiment of the disclosed subject matter.

FIG. 6B illustrates a second size of transmission period for an LAT procedure according to an embodiment of the disclosed subject matter.

FIG. 13A illustrates a wireless communication device according to an embodiment of the disclosed subject matter.

FIG. 13B illustrates a wireless communication device according to another embodiment of the disclosed subject matter.

DETAILED DESCRIPTION

Figure 1:
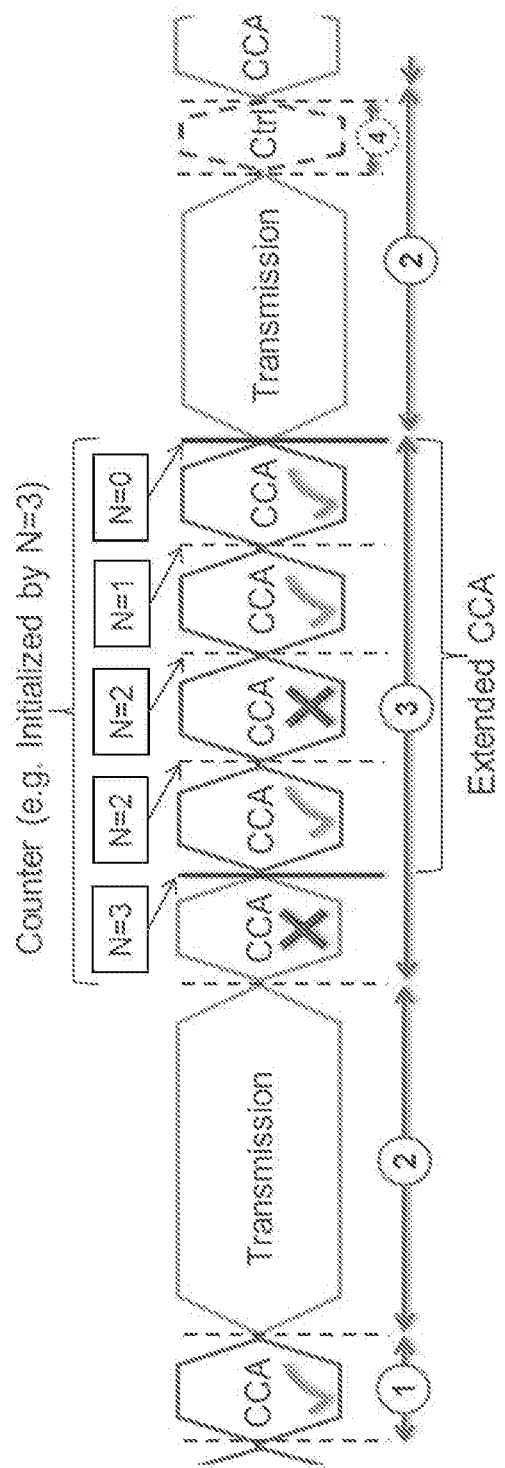
FIG. 1 illustrates listen-before-talk (LBT) in EN 301.893.
Figure 2:
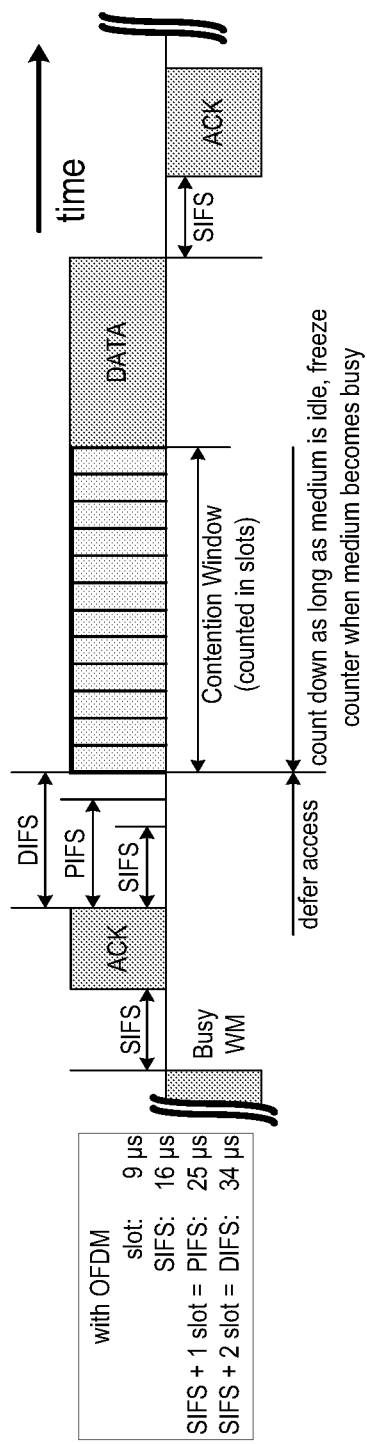
FIG. 2 illustrates listen-before-talk (LBT) in Wi-Fi.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the disclosed subject matter. Moreover, the described features may be combined with each other in any reasonable fashion.

Listen-After-Talk

Certain embodiments relate to LAT, which may in certain contexts result in superior performance compared to LBT. In the description that follows, the term "source node" (SN) will refer to a device (e.g. a UE or base station) attempting to send or transmit information using LAT or LBT, and the term "destination node" (DN) will refer to a device to which the SN is attempting to send or transmit.

Unlike classical omni-directional transmit and receive antenna radiation patterns, directional communication has different hidden and exposed terminal problems. Moreover, narrow beamwidth directional transmissions are more prone to a deafness problem compared to wider beamwidth transmissions.

Hidden terminal problem refers to a situation where the SN is unable to listen to a potential interferer resulting in packet collision (i.e. interference) at the DN.

Exposed terminal problem refers to the case when the SN overhears an ongoing transmission and refrains from its own transmission although its transmission would have not interfered with the ongoing transmission at the DN.

Deafness problem refers to the case when a DN is unable to hear the (directional) transmission from a SN.

LAT may be used to address or avoid the hidden and exposed node problems in communications using massive numbers of antennas, e.g. for beamforming and beamsteering. One reason for the hidden and exposed node problems is a large difference between sensed power at the source node (SN) side and interference power at the destination node (DN) side in high gain beamforming case. LBT relies on listening at transmitter side to determine if there will be interference at the receiver side and thus large difference between them will result in severe problems. To address it, LAT considers involving the receiver to sense the channel directly. Another motivation for LAT is low interference environment i.e., low number of collisions for naïve direct transmissions. For this reason, LAT adopts a different logic compared to LBT, described as follows: the default mode for transmitter is 'to send' and data is not sent only when it is confirmed that channel is occupied by interfering transmissions. The idea is that the SN transmits when data packets arrive and then solve collision detected by DN using coordination signaling.

The following terms will apply to the description of LAT.

"Idle time" is assumed after continuous data transmission. This is reasonable for shared spectrum (e.g., unlicensed band) because there are typically channel occupation limitation rules, e.g., the SN must stop transmitting and enter idle state after the contiguous transmission time exceeds a given threshold. Such an enforced limitation can also be exercised to ensure that different nodes are able to share the radio resource. This is to avoid a situation where one particular node simply occupies the medium for really long durations thereby depriving others from carrying out data transmissions. A "Notify-To-Send" (NTS) message can be transmitted by SN or DN, including link information which will transmit data and expected occupation time duration. A "Notify-Not-To-Send" (NNTS) message is transmitted by DN to inform its SN not to transmit data in indicated duration.

Figure 3:
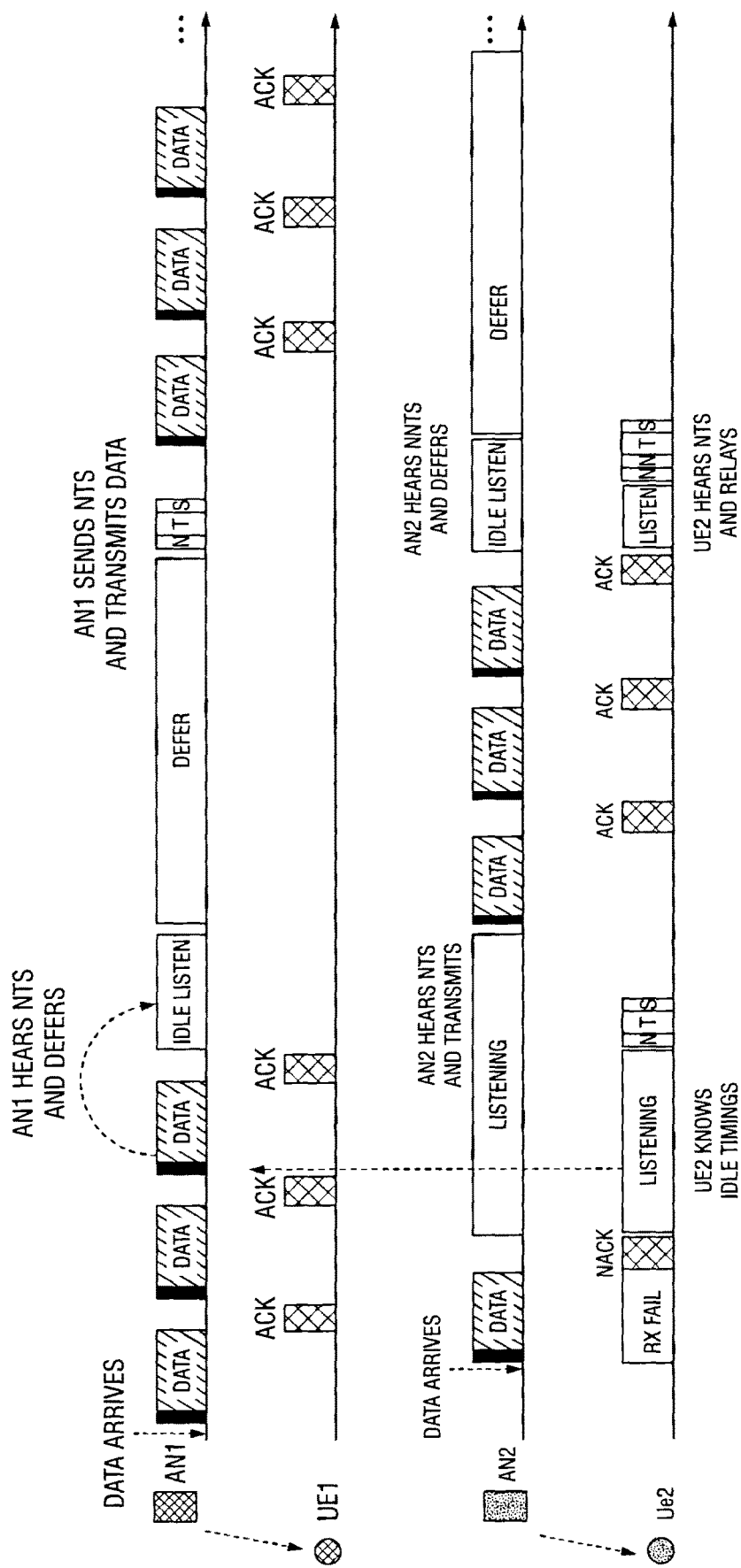
FIG. 3 illustrates an example Listen-After-Talk (LAT) procedure in which a link from an access node AN2 to a user equipment UE2 (AN2→UE2) is interfered by a link from an access node AN1 to a user equipment UE1 (AN1→UE1).

FIG. 3 illustrates an example LAT procedure in which a link from an access node AN2 to a user equipment UE2 (AN2→UE2) is interfered by a link from an access node AN1 to a user equipment UE1 (AN1→UE1). In this example, first the listening function at the DN side is triggered when it detects interference and fails to receive the data. Then the DN of interfered link will coordinate the data transmission with SN of the interfering link(s). Finally, the coordination will be performed in idle time of interfering link. In the example of FIG. 3, AN2→UE2 is interfered by AN1→UE1.

When UE2 fails to decode the data, it starts to look for the idle period of the interfering link and sends NTS message towards the AN2 direction. Because UE2 is interfered by AN1, AN1 can receive the message as well and then defer the transmission as NTS indicates. Besides, NTS also indicates when AN2 will stop transmission and listen, i.e., idle period of AN2→UE2. Then AN1 transmits NTS that can be received by UE2. Finally, NNTS is relayed by UE2 to let its transmitter AN2 know which resource is occupied by the interfering link and refrain from transmitting. By this scheme, the transmission of this interference pair (i.e. AN1-UE1 and AN2-UE2) is coordinated in a distributed way in order to carry out transmissions efficiently by taking turns.

Figure 4A:
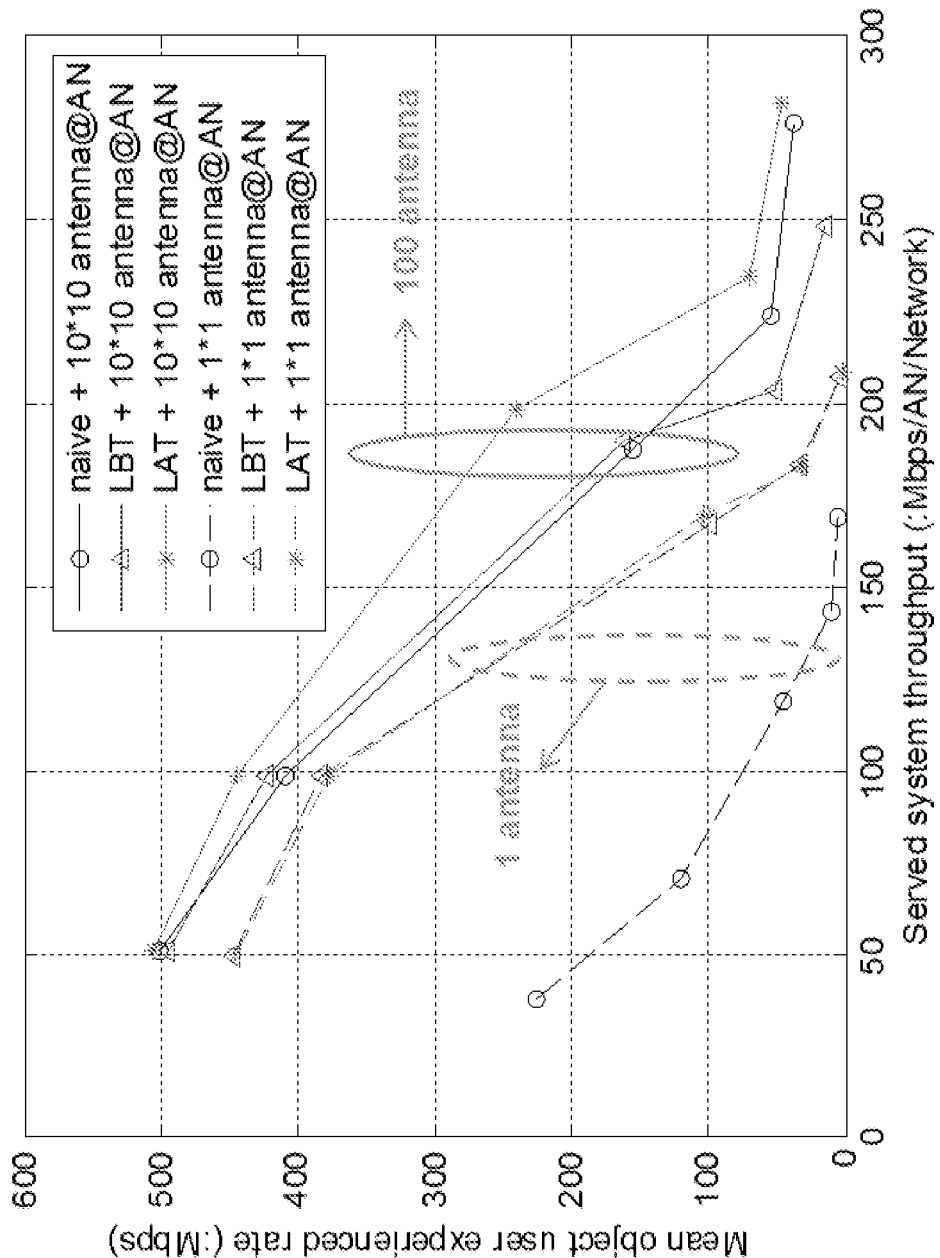
FIG. 4A illustrates mean object user experienced rate versus served system throughput for respective LAT and LBT procedures.
Figure 4B:
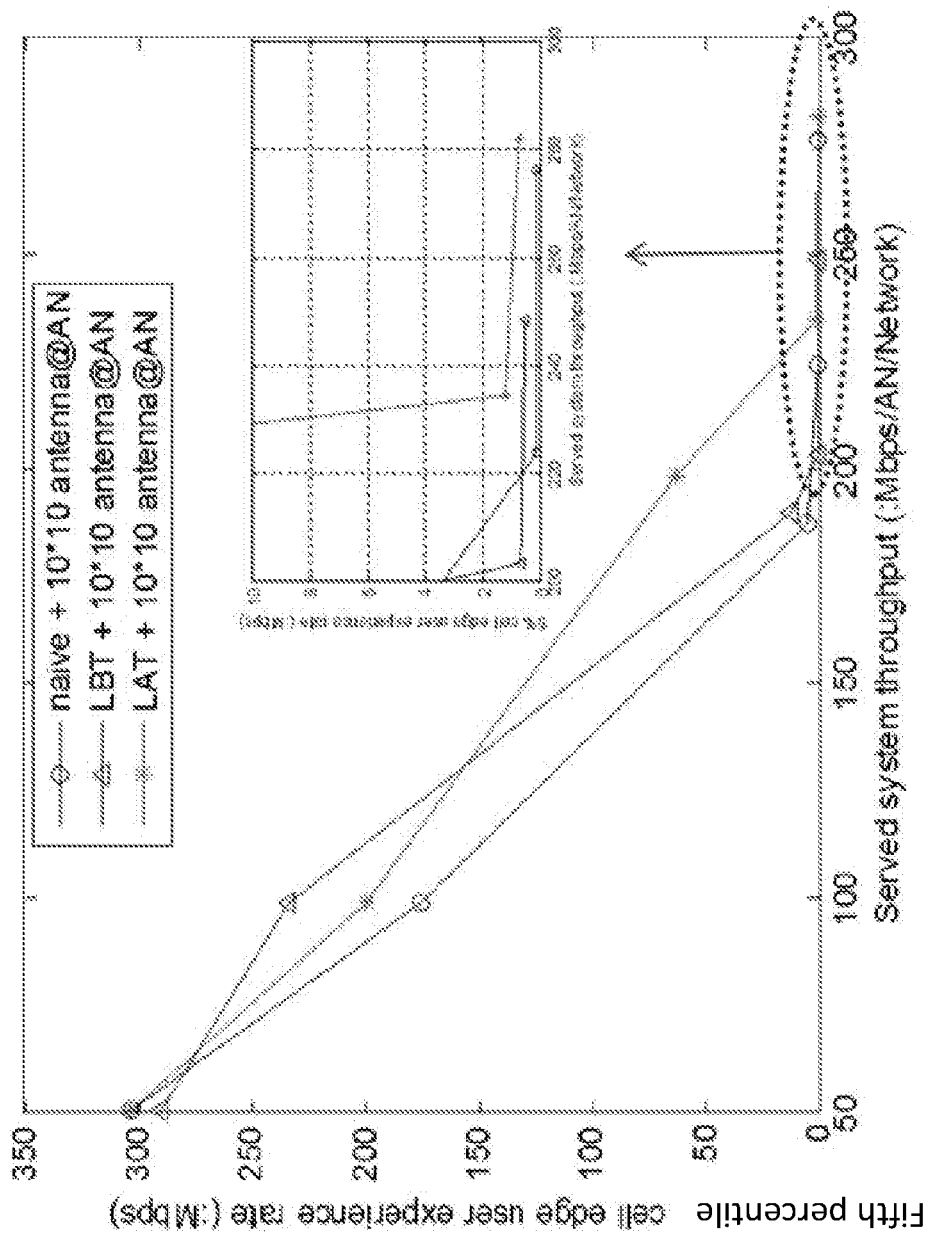
FIG. 4B illustrates cell edge user experienced rate versus served system throughput for respective LAT and LBT procedures.

To compare different coexistence mechanisms, extensive simulations have been conducted to study both mean object user experience rate and 5 percentile cell edge user rate under different traffic settings. From dashed curves in FIG. 4A, it can be observed that LBT works much better than naïve schemes (i.e., direct transmission without any coordination) and has similar performance with LAT in 1 antenna case. This means LBT is preferred which is widely used in current systems. However, in the case of a 100 antenna array as shown in solid lines of FIG. 4A, LBT has similar performance with a naïve scheme in low traffic case and worse performance than the naïve scheme in high traffic case. On the other hand, LAT has much better performance than LBT in terms of mean and 5 percentile cell edge experienced rate, as evident from FIG. 4B.

In consideration of at least the above observations, certain embodiments of the disclosed subject matter use LAT for highly directional transmissions, where advanced antennas are used for beamforming and beamsteering. In some embodiments, the LAT mechanism can be exercised in an efficient manner by introducing adaptation and reconfiguration aspects. The reconfiguration for LAT can be based on various factors such as network size and topology, spectral interference, beamwidth of directional transmissions, traffic characteristics and the mobility. Moreover, past behavior is taken into account in the reconfiguration aspects.

Certain embodiments provide methods for adapting the transmission duration (both the listening instants and listening time period) in an LAT procedure. Certain embodiments also use combined acknowledgement frames in the LAT procedure instead of per frame acknowledgement frames based on the subjected spectral (channel) conditions and the past behavior. The adaptation aspects in the acknowledgement include how often the combined acknowledgement frames are issued, i.e., adapting the interval after which a combined acknowledgement frame is sent out.

Certain embodiments are presented in recognition of the above shortcomings associated with conventional techniques and technologies, such as the following examples. LAT may perform much better than LBT in a beamforming case with massive MIMO (i.e. large antenna systems) and for directional transmissions. However, NR or other future wireless systems with high gain beamforming would not be able to rely solely on a single listen-after-talk configuration to have high performance characteristics, and it may be important to use adaptation and reconfiguration features in a flexible fashion depending upon the network configuration, traffic characteristics, beamwidth, mobility and spectral conditions.

Certain embodiments may provide potential benefits compared to conventional techniques and technologies, such as the following examples.

An LAT procedure may be used for directional transmissions to circumvent problems of using LBT based medium access as described below and evident from simulation results shown in FIG. 4.

Certain embodiments aim to improve system performance by adapting an LAT procedure in various ways. For example, the timing instant for carrying out a "listening" operation (i.e., transmission period) and, the duration of a listening interval may be dynamically selected. Furthermore, the concept of using and adapting combined acknowledgement is introduced in the LAT procedure.

This may allow efficiently sending out more data frames (and large data sized frames) without having the need to listen sooner for potentially NTS frames when the contention in the medium is low or when using highly directional transmission, i.e., when spectral interference and collision probability are estimated to be low.

Depending on channel conditions, reliability of data transmission and interference encountered, certain embodiments allow adapting the data frame sizes, which leads to efficient transmission. The data frame sizes can be adapted within a particular transmission attempt.

When the channel conditions are favorable, i.e., contention level is low or when using highly directional transmissions (interference probability is low), certain embodiments allow using combined or block acknowledgment. Moreover, depending upon the dynamic conditions, the number of acknowledgement frames combined is adapted within a given LAT based transmission and over multiple (successive) separate transmissions. This leads to effectively higher data rates and lower control overhead.

The listening interval itself can be adjusted based on any of various factors, such as the beamwidth of the transmission, the contention in the medium, reliability of data transmission, etc. The underlying rationale is described in the following: when using low beamwidth, the listening interval is made shorter as the potential interference to other nodes is reduced, and vice-versa. Moreover, if the contention in the medium is assessed to be low, the listening interval can be made shorter and vice-versa in order to lower the interference effects.

By reducing idle listening and lowering the control overhead, LAT transmissions become more spectrally efficient (i.e., efficient utilization of radio resource to exchange data) and energy efficient, as enabled by certain embodiments. Moreover, certain embodiments lead to reduced spectral interference and number of collisions, which implicitly lead to lower energy consumption.

Certain embodiments also allow communication devices (both base-station and UEs) to use LAT configuration with more robust mechanisms (involving higher control overhead) when the spectral and network conditions become worse (e.g., higher contention level, collisions, etc.).

In this description, some terms from third generation partnership project (3GPP) NR are used in relation to certain embodiments. The use of such terms, however, should not be seen as limiting the scope of the disclosed subject matter to 3GPP systems. Other wireless systems such as Wi-Fi may also benefit from the disclosed concepts. Additionally, while there are significant reasons to use directional communication for cm-Wave and mm-Wave frequencies, the concepts described herein are also valid for other lower frequencies, where directional transmissions can be used. Moreover, although certain embodiments are presented with reference to unlicensed spectrum, the described concepts may apply additionally to license shared spectrum and licensed spectrum.

Terms such as base station/eNodeB and UE, among others, should be considered non-limiting and do not imply a certain hierarchical relation between the two; in general "eNodeB" could be considered as device 1 and "UE" could be considered as device 2 and these two devices communicate with each other over some radio channel. In an LAT procedure, an eNodeB or a UE could be either a sending node or a destination node.

Certain embodiments rely on a metric (W) to govern adaptation of LAT parameters. The metric may take into account e.g. conditions of the medium, traffic characteristics, network topology and past behavior, which is used to carry out adaptation decisions. This metric can be referred to as a weighting function or a utility function, and may be defined as follows.

$$W = w1 \cdot P1 + w2 \cdot P2 + w3 \cdot P3 + w4 \cdot P4 + \ldots + wi \cdot Pi \quad \text{(Equation 1)}$$

In Equation 1, the parameters, P1, P2 ... Pi, are the influencing factors or parameters and w1, w2 ... wi are corresponding weights indicating the relative impact of the parameters. The weighting factors could be pre-selected based on the network scenario itself and can also be adapted later on according to the varying network (e.g. topology and density of deployments), channel conditions and the contention level. The values for the weighting factors are in the range [0, 1] and are normalized so that their sum equals to 1, $\Sigma_i w_i = 1$.

As an example, these parameters (Pi) may include the following. $P_1$ is a parameter indicating the inverse of the spectral interference, i.e., cleanliness of the medium. $P_2$ indicates the reliability index such as the frame reception ratio. It indicates how many frames sent out using the LAT procedure have been acknowledged. $P_3$ indicates the inverse of the transmission beamwidth for directional transmissions. $P_4$ indicates the inverse of the contention level in the medium. $P_5$ indicates the past behavior or past value of W. This allows reflecting the past behavior and capturing the historic behavior of the weighting function. Other parameters may include the priority level of the traffic, density of network deployment, etc.

The weighting function can be computed at regular periodic instants of time (in a periodic fashion) or it can be event-based, i.e., computed every time a reception or transmission in the LAT procedure is carried out. The configuration for computing the weighting function and the decisions can be changed at runtime accordingly. Various alternative embodiments are described below. One or more of the described embodiments can be implemented in combination, or various features of the embodiments can be combined.

Adapting Listening Instant of LAT Procedure

One of the concepts described herein is adapting the listening period after sending out a first data frame. If the weighting function (e.g., Equation [1]) has a large value, i.e., interference level in the medium is low (for instance, when using narrow beamwidth transmissions), the contention level is estimated to be low in the medium, etc., LAT adapts a longer listening period.

On the other hand, if the weighting function has a small value, i.e., contention level is high or when using wider beamwidth transmissions (i.e., more prone to spectral interference), the listening period is shortened. This case allows opportunistically transmitting more number of frames when the medium tends to be free before needing to perform the listening operation for potentially receiving the NTS frame as part of the LAT procedure. In the following, we describe the different embodiments.

Data Frame Sizes

Figure 5A:
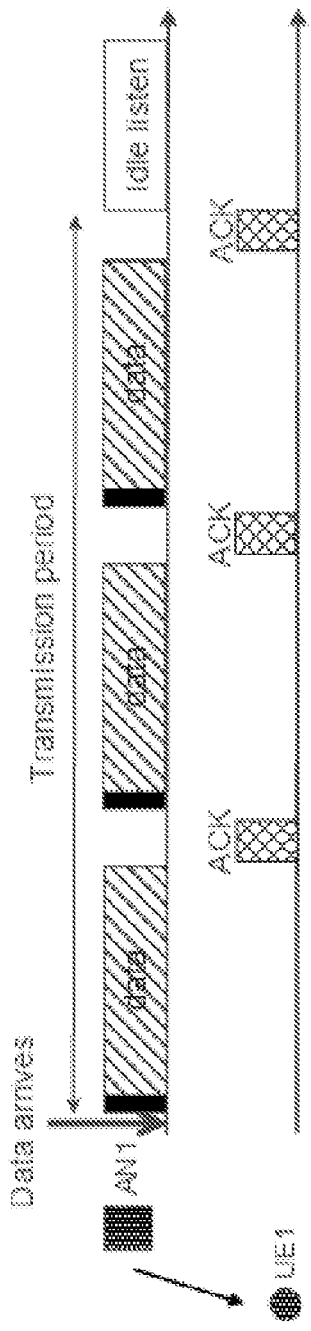
FIG. 5A illustrates a first size of frame transmissions in an LAT procedure according to an embodiment of the disclosed subject matter.
Figure 5B:
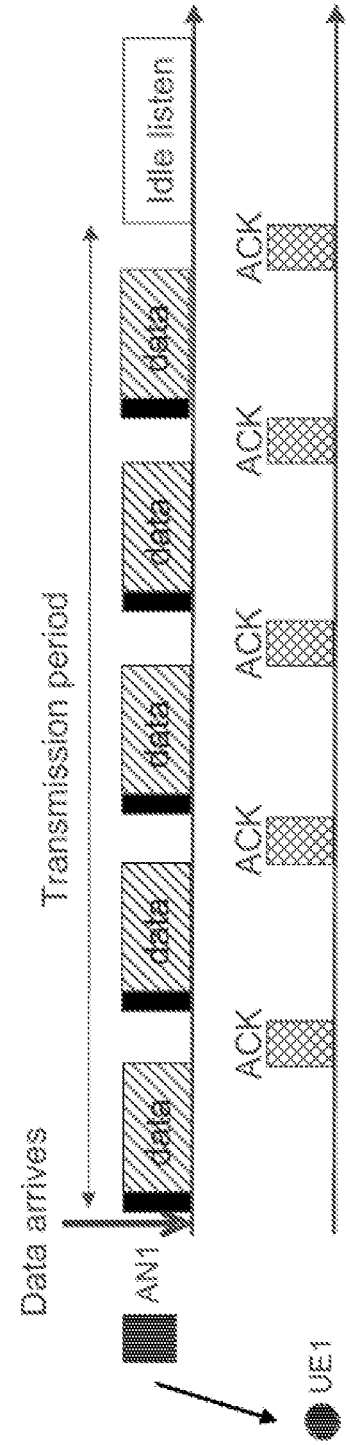
FIG. 5B illustrates a second size of frame transmissions in an LAT procedure according to an embodiment of the disclosed subject matter.

The data frame size or the transmission interval can be adapted based on the weighting function. A smaller frame size adds more control overhead during transmission but reduces the chances of data frame being interfered. Moreover, the incurred retransmission overhead is larger for longer frame sizes. The data frame size or the transmission intervals should therefore be selected in an intelligent manner that takes into account a number of factors like the contention level in the medium, traffic loads, transmission beamwidths, etc.—factors essentially modeled by the weighting function (W) as defined in equation (1). If the metric value represented through the weighting function is large, a network decides to send larger data frames to exploit the suiting channel conditions. On the other hand, if the weighting function has a small value, the network may adapt using smaller sized data frames. FIG. 5 illustrates that if the weighting function has a large value, longer frame transmissions can be carried out and vice-versa.

FIG. 5 illustrates different sized frame transmissions. (a) If the weighting function (W) is large, larger sized data frames or longer transmission time intervals are used. (b) If the weighting function is (W) is small, smaller sized data frames are used.

Number of Data Frames

In some embodiments, the LAT procedure is controlled to adapt the number of data frames sent out corresponding to the selected listening period. This decision is governed through the weighting function defined in Equation (1). If the weighting function indicates good transmission conditions, a network may opportunistically exploit the medium by prolonging the listening period, and vice-versa.

FIG. 6 illustrates different durations of a transmission period. (a) If the weighting function (W) is small, a relatively shorter transmission period is used. (b) If the weighting function is (W) is large, a relatively longer transmission period is used.

Adaptive Data Frame Size

Figure 7:
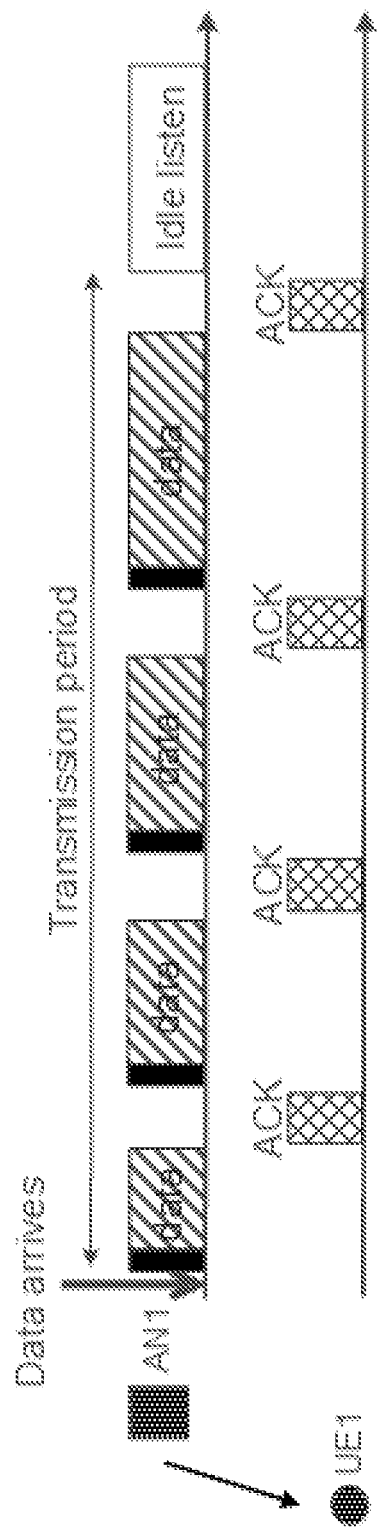
FIG. 7 illustrates adaptation of data frame size within an LAT transmission period according to an embodiment of the disclosed subject matter.

In some embodiments, the data frame size is adjusted based on the weighting function during the course of an ongoing LAT transmission. If the weighting function has a larger value, larger data sizes are used, and vice-versa. Because the weighting function can be computed after the transmission and reception of any frame (control or data) transmitted, it allows adapting the data frame sizes within a given LAT transmission. FIG. 7 illustrates this as an example. Of course, there could be implementation specific and hardware capability limits on the minimum and maximum sized data frames, which are not altered further. Also the step size of increase or decrease can be flexibly chosen based on the implementation.

FIG. 7 illustrates adaptation of data frame size within an LAT transmission period. If the weighting function is relatively large, correspondingly a larger data frame size can be used, and vice versa. The illustration shows the case when the weighting function increases and hence each subsequent data frame size is relatively large.

Adapting Combined Acknowledgement Frame in the LAT Procedure

In some embodiments, the LAT procedure is controlled to adapt ACK frame transmissions based on the weighting function. If the ACK frame is issued for each transmitted data frame, it takes a longer air-time for transmission as well as the time for listening the frame. Therefore, we introduce the idea of using combined ACK frames in the LAT procedure based on the weighting function. If the weighting function has a large value, i.e., the transmission conditions are more favorable, the network may adapt not to issue ACK frame for each transmitted frame, and vice-versa.

Figure 8A:
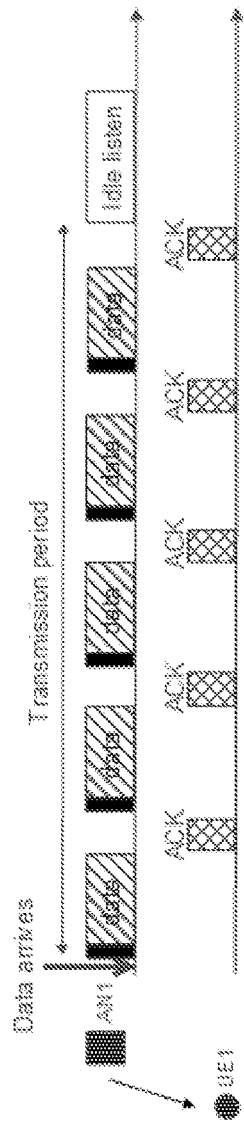
FIG. 8A illustrates using a single ACK frame per data frame based on a weighting function in an LAT procedure according to an embodiment of the disclosed subject matter.
Figure 8B:
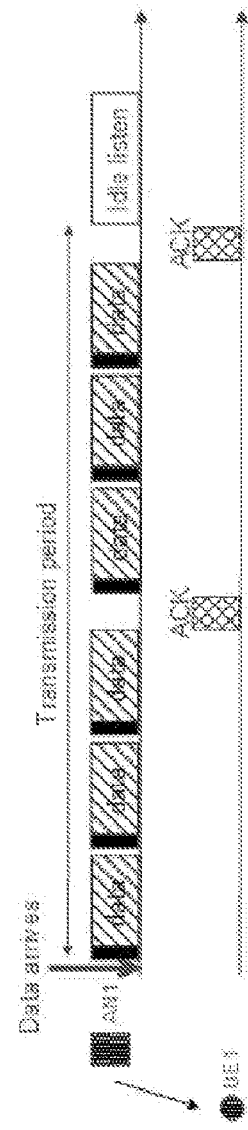
FIG. 8B illustrates a single ACK frame per three data frames based on a weighting function in an LAT procedure according to an embodiment of the disclosed subject matter.
Figure 8C:
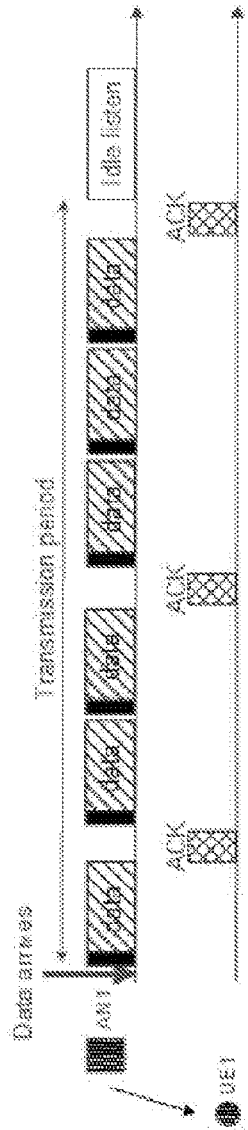
FIG. 8C illustrates a single ACK frame per different numbers of data frames based on a weighting function based adaptation in an LAT procedure according to an embodiment of the disclosed subject matter.

FIG. 8 shows an example where different number of data and ACK frames are transmitted in a given listening period in the LAT procedure. In FIG. 8(a), an ACK frame is issued after the transmission of every data frame. In FIG. 8(b), a combined ACK frame is issued after the transmission of every third data frame, which substantially improves the LAT transmission efficiency. Please note that compared to FIG. 8(a), the example in FIG. 8(b) shows that within the same listening period, more number of data frames have been sent out. Furthermore, during the LAT transmission, the combined ACK frame scheme can be also adapted. FIG. 8(c) shows that ACK frame is issued after the transmission of different number of ACK frames. If the weighting function indicates an increasing behavior, the combined ACK frame transmission can be made sparse within a given listening interval, and vice-versa.

Adapting the Listening Interval in the LAT Procedure

In the LAT procedure as described in relation to FIG. 3, an "idle listen" operation is performed to potentially receive NTS frames. If the contention level is high in the network or higher traffic loads, etc. (i.e., weighting function W is small), a longer listening interval can be used.

Figure 9A:
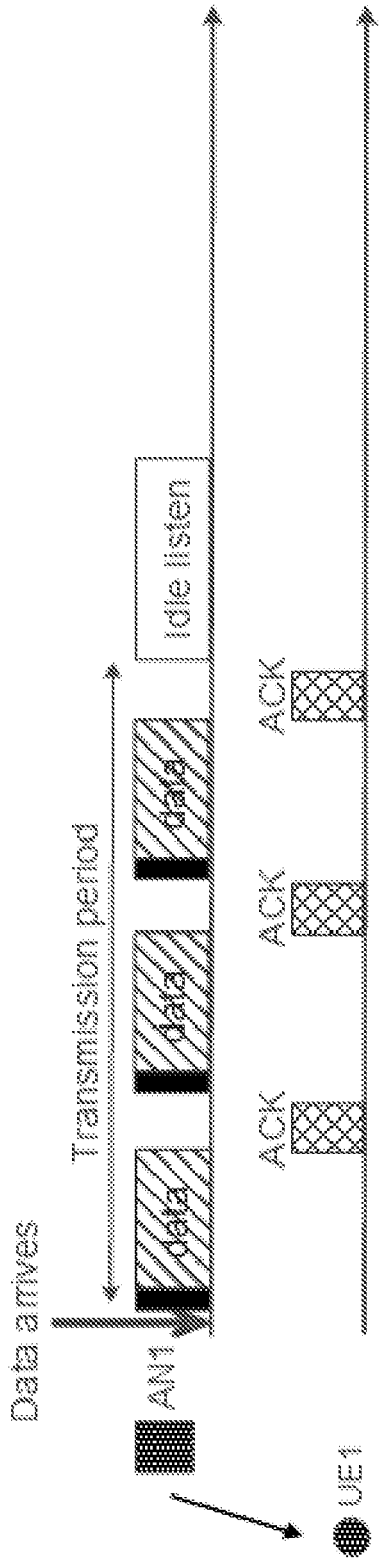
FIG. 9A illustrates a first duration of a listening interval for an LAT procedure according to an embodiment of the disclosed subject matter.
Figure 9B:
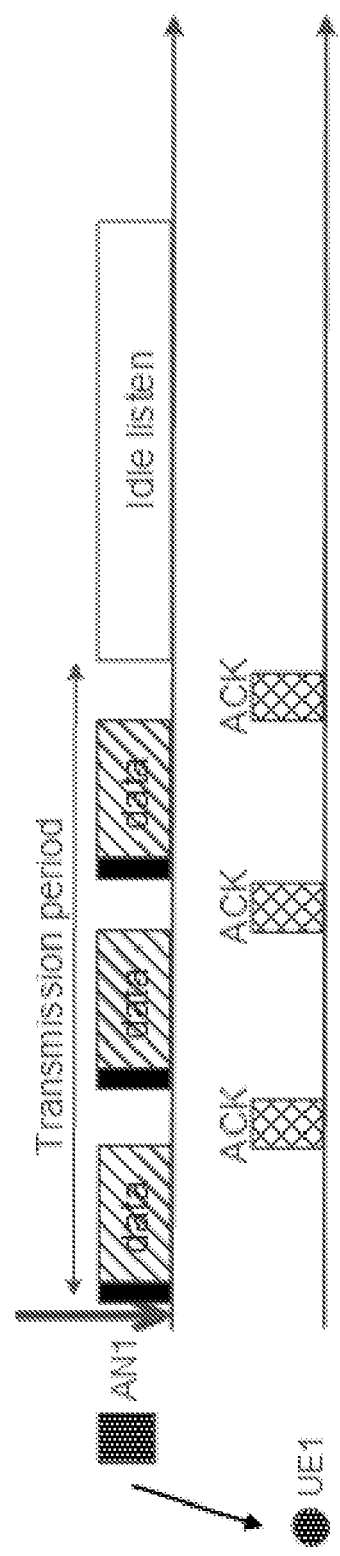
FIG. 9B illustrates a second duration of a listening interval for an LAT procedure according to an embodiment of the disclosed subject matter.

FIG. 9 illustrates different durations of the listening intervals. More specifically, FIG. 9(a) shows that the listening interval in the LAT procedure is smaller compared to the illustration in FIG. 9(b). This corresponds to bigger and smaller values of the weighting function W, respectively.

Figure 10:
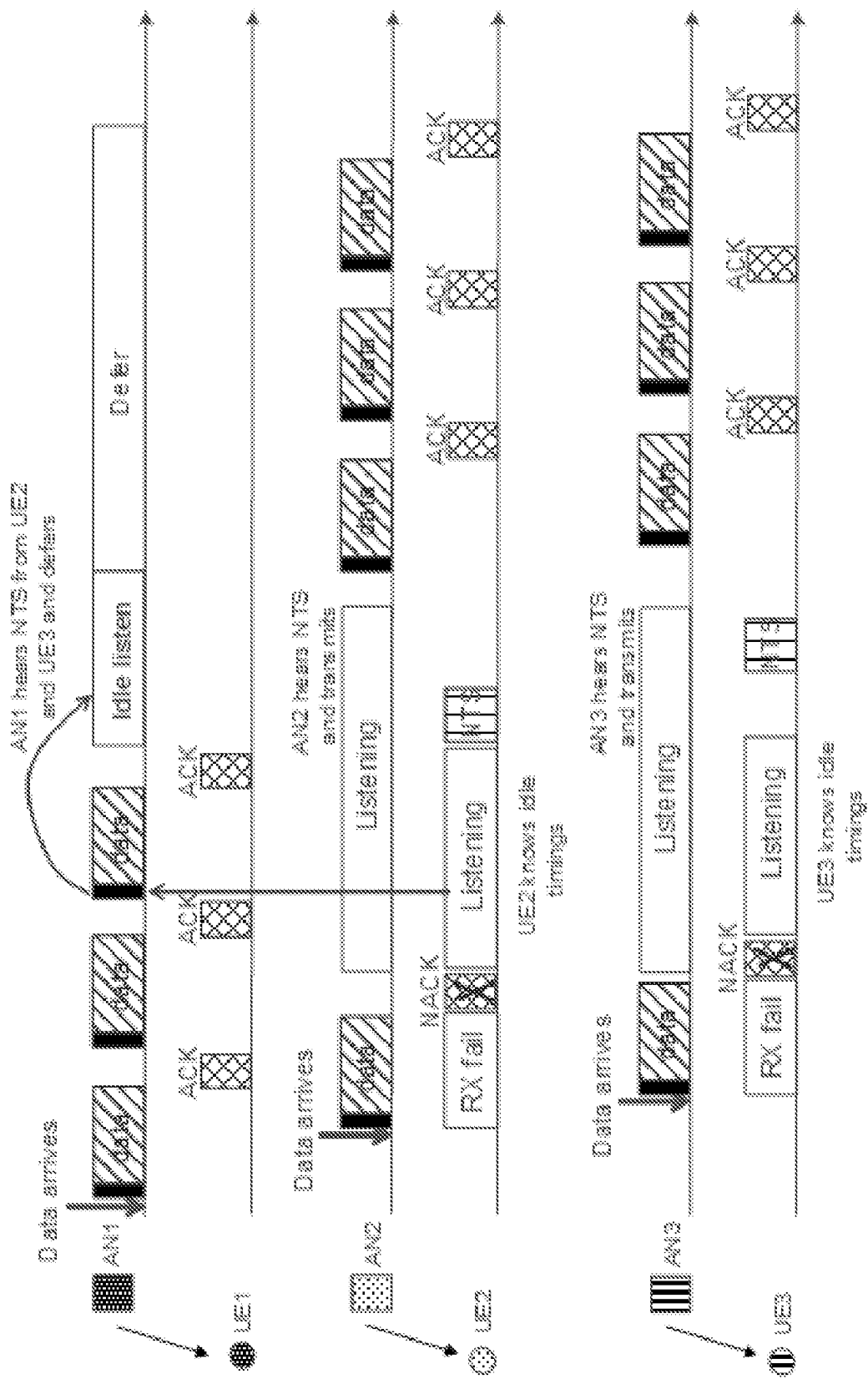
FIG. 10 illustrates an example of an LAT procedure where transmissions by a first access node (AN) to a first user equipment (UE) interfere with the transmissions by a second AN to a second UE and a third AN to a third UE, according to an embodiment of the disclosed subject matter.

A longer listening interval allows a network to listen to multiple NTS and/or NNTS frames, and defer accordingly. Note that the transmission instants for NTS frames can be arbitrated in time (for instance, based on the addressing information, location context, or a combination of the above, etc.) to avoid potential collisions. In the example of FIG. 10, AN1 is able to listen to the NTS transmissions from UE2 and UE3, and defer accordingly. The prolonging of the idle listen interval is based on the contention level and amount of traffic in the network, etc., which are captured by the weighting function W. Note that in the example of FIG. 9, the directional transmissions from AN2 and AN3 to UE2 and UE3 respectively do not interfere with one another.

FIG. 10 illustrates an example of the LAT procedure where the transmissions by AN1 to UE1 interfere with the transmissions by AN2 to UE2 and AN3 to UE3. By having a prolonged idle listen interval AN1 is able to listen to NTS transmissions from UE2 and UE3, and defer accordingly.

Figure 11A:
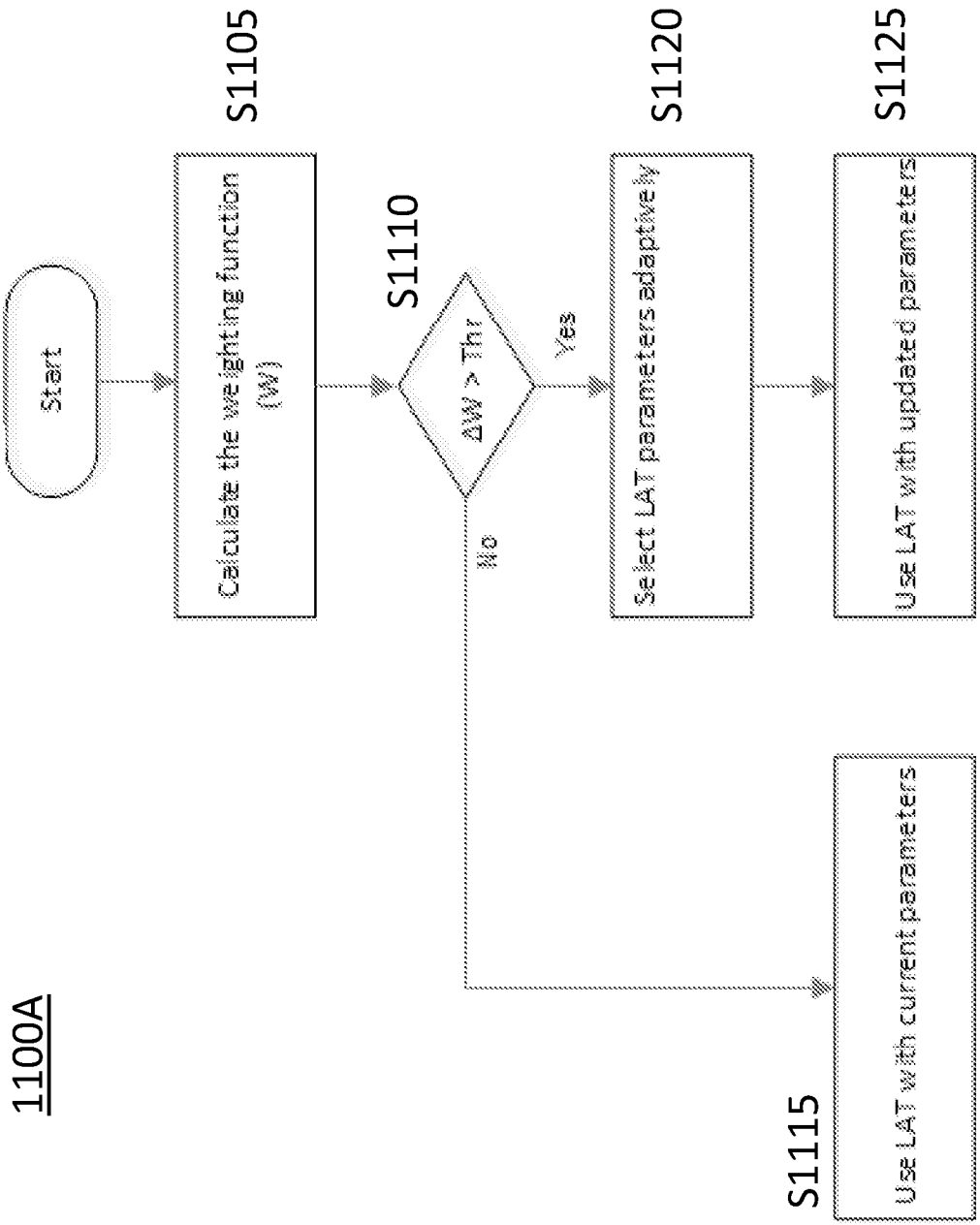
FIG. 11A illustrates a method of reconfiguration of an LAT procedure according to an embodiment of the disclosed subject matter.

FIG. 11A illustrates a method of reconfiguration of an LAT procedure according to an embodiment of the disclosed subject matter.

Referring to FIG. 11A, a node calculates the weighting function (W) (S1105). If the change in the weighting function $\Delta W$ is smaller or equal to a configurable threshold in Step (S1110), the same parameters are used in the LAT operation in Step (S1115). If $\Delta W$ is greater than a configurable threshold, LAT parameters are adapted as described above (S1120). Thereafter, the LAT operation is carried out with new configuration of the parameters (S1125). Note that the configurable threshold in S1110 can be either pre-configured based on a deployment setting, system or hardware specifics, or can be adapted on-the-fly during the operation of the system (e.g., based on a learning algorithm, etc.). The calculation of the weighting function can be carried out once before the LAT transmission attempt, performed periodically or can be computed during the LAT based transmission operation such as after the transmission and reception of a frame.

Figure 11B:
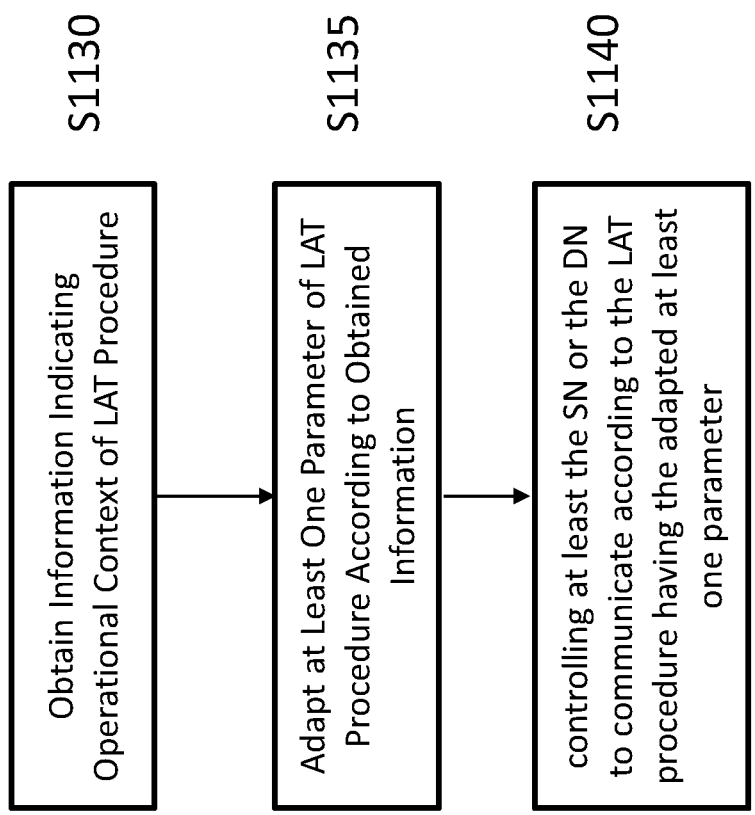
FIG. 11B illustrates a method of controlling an LAT procedure in a wireless communication network comprising at least a source node (SN) and a destination node (DN) according to an embodiment of the disclosed subject matter.

FIG. 11B illustrates a method of controlling an LAT procedure in a wireless communication network comprising at least a source node (SN) and a destination node (DN) according to an embodiment of the disclosed subject matter.

Referring to FIG. 11B, the method comprises obtaining information indicating an operational context of the LAT procedure (S1130), adapting at least one parameter of the LAT procedure according to the obtained information (S1135), and controlling at least the SN or the DN to communicate according to the LAT procedure having the adapted at least one parameter (S1140).

The operational context of the LAT procedure may comprise e.g. at least one of a condition of a communication medium, traffic characteristics, a network topology, and past behavior of the LAT procedure. Such past behavior could include, in one example, a current or past value of W as defined by Equation (1).

Adapting the at least one parameter of the LAT procedure may comprise e.g. adjusting a duration of a listening period to be employed by the SN after a transmission period. Adjusting the duration of the listening period may comprise e.g. increasing the listening period in consideration of relatively narrow beamwidth transmissions or relatively low channel contention, and decreasing the listening period in consideration of relatively wide beamwidth transmissions or relatively high channel contention.

Adapting the at least one parameter of the LAT procedure may alternatively comprise adjusting a data frame size to be used for transmissions by the SN, adjusting a transmission period to be used for transmissions by the SN, adjusting a number of data frames to be transmitted by the SN during a transmission period, or adjusting a number of data frames to be transmitted per acknowledgement (ACK) frame.

The information indicating the operational context of the LAT procedure may comprise a metric determined by a weighted sum of factors including at least one of a condition of a communication medium, traffic characteristics, a network topology, and past behavior of the LAT procedure. Moreover, in this context, the method may further comprise determining whether the metric exceeds a predetermined threshold, and adapting the at least one parameter of the LAT procedure according to the obtained information, as a consequence of whether the metric exceeds the predetermined threshold. The factors could include e.g. the past behavior of the LAT procedure, as indicated by a prior value of the metric.

The above method may be performed jointly and/or independently by each node (SN and DN), i.e., both access network node (e.g. base station, eNB) and terminal device (e.g. UE). The nodes may also employ a signaling procedure to exchange messages allowing the SN and DN to adjust the timings (i.e., adapt the timings) for each transmission. Some examples are provided below.

In one example, the SN decides how long data frames to transmit based on the assessment of the link in previous transmissions. The data frame size can further be adjusted during the course of transmission based on the ACK feedback from the receiver (DN). There is typically a "control part" (i.e., header) in each data frame, which may contain the information about such decisions. For instance, the data frame header may contain the information for transmitting an explicit ACK frame for each data frame or transmitting a combined ACK for multiple data frames. In this context, the combined ACK is a cumulative ACK, which is sent for multiple data frames received. The header of a data frame also contains information on how long the data transmission will last, source and destination information, etc. which allow other nodes to accordingly adapt their listening instants, carry out parallel transmissions in non-interfering direction by using spatial multiplexing techniques, etc.

The described embodiments may be implemented in any appropriate type of communication system supporting any suitable communication standards and using any suitable components. As one example, certain embodiments may be implemented in a communication system such as that illustrated in FIG. 12. Although certain embodiments are described with respect to 3GPP systems and related terminology, the disclosed concepts are not limited to 3GPP system. Additionally, although reference may be made to the term "cell", the described concepts may also apply in other contexts, such as beams used in 5G systems, for instance.

Figure 12:
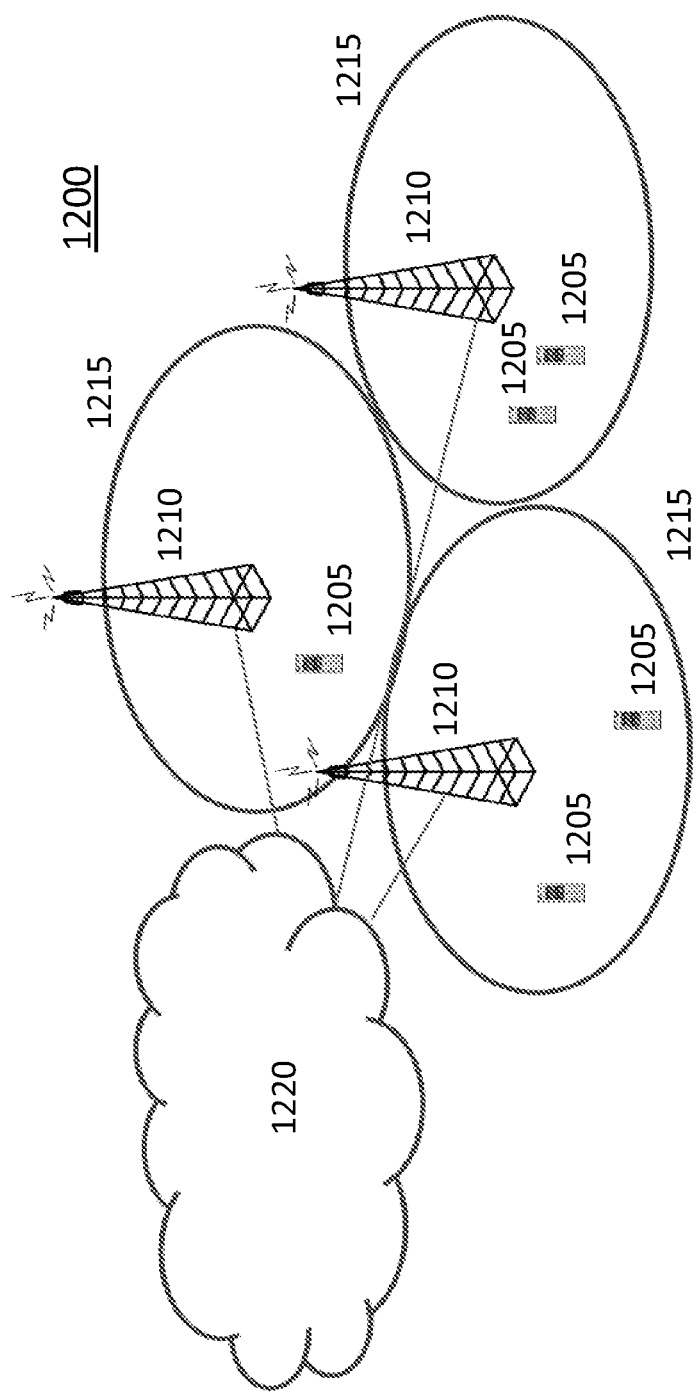
FIG. 12 illustrates a communication system according to an embodiment of the disclosed subject matter.

Referring to FIG. 12, a communication system 1200 comprises a plurality of wireless communication devices 1205 (e.g., UEs, machine type communication [MTC]/machine-to-machine [M2M] UEs) and a plurality of radio access nodes 1210 (e.g., eNodeBs or other base stations). Communication system 1200 is organized into cells 1215, which are connected to a core network 1220 via corresponding radio access nodes 1210. Radio access nodes 1210 are capable of communicating with wireless communication devices 1205 along with any additional elements suitable to support communication between wireless communication devices or between a wireless communication device and another communication device (such as a landline telephone). In the embodiments described above with reference to FIGS. 1-11, for instance, any of radio access nodes 1210 or wireless communication devices 1205 could constitute an SN or DN.

Although wireless communication devices 1205 may represent communication devices that include any suitable combination of hardware and/or software, these wireless communication devices may, in certain embodiments, represent devices such as those illustrated in greater detail by FIGS. 13A and 13B. Similarly, although the illustrated radio access node may represent network nodes that include any suitable combination of hardware and/or software, these nodes may, in particular embodiments, represent devices such those illustrated in greater detail by FIGS. 14A, 14B and 15.

Referring to FIG. 13A, a wireless communication device 1300A comprises a processor 1305 (e.g., Central Processing Units [CPUs], Application Specific Integrated Circuits [ASICs], Field Programmable Gate Arrays [FPGAs], and/or the like), a memory 1310, a transceiver 1315, and an antenna 1320. In certain embodiments, some or all of the functionality described as being provided by UEs, MTC or M2M devices, and/or any other types of wireless communication devices may be provided by the device processor executing instructions stored on a computer-readable medium, such as memory 1310. Alternative embodiments may include additional components beyond those shown in FIG. 13A that may be responsible for providing certain aspects of the device's functionality, including any of the functionality described herein.

Referring to FIG. 13B, a wireless communication device 1300B comprises at least one module 1325 configured to perform one or more corresponding functions. Examples of such functions include various method steps or combinations of method steps as described herein with reference to wireless communication device(s). In general, a module may comprise any suitable combination of software and/or hardware configured to perform the corresponding function. For instance, in some embodiments a module comprises software configured to perform a corresponding function when executed on an associated platform, such as that illustrated in FIG. 13A. In one example embodiment, wireless communication device 1300B comprises an obtaining module configured to obtain information indicating an operational context of the LAT procedure, an adapting module configured to adapt at least one parameter of the LAT procedure according to the obtained information, and a controlling module configured to control at least the SN or the DN to communicate according to the LAT procedure having the adapted at least one parameter.

Figures 14A, 14B:
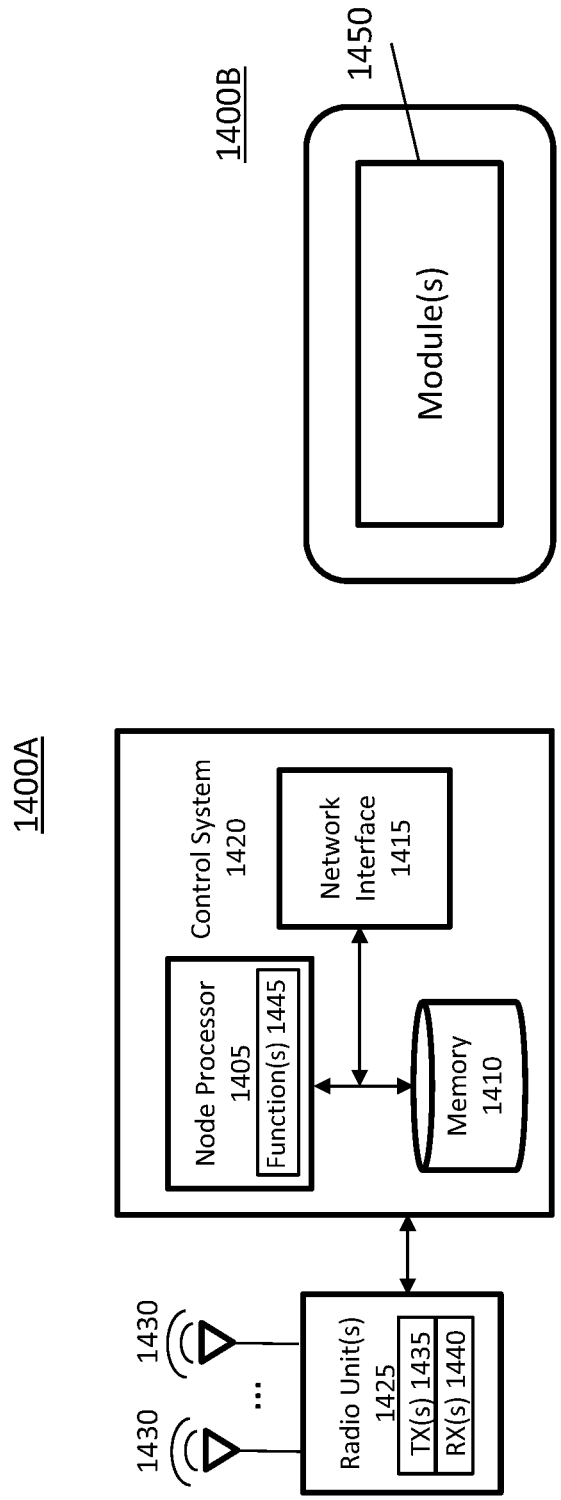
FIG. 14A illustrates a radio access node according to an embodiment of the disclosed subject matter.
FIG. 14B illustrates a radio access node according to another embodiment of the disclosed subject matter.

Referring to FIG. 14A, a radio access node 1400A comprises a control system 1420 that comprises a node processor 1405 (e.g., Central Processing Units (CPUs), Application Specific Integrated Circuits (ASICs), Field Programmable Gate Arrays (FPGAs), and/or the like), memory 1410, and a network interface 1415. In addition, radio access node 1400A comprises at least one radio unit 1425 comprising at least one transmitter 1435 and at least one receiver coupled to at least one antenna 1430. In some embodiments, radio unit 1425 is external to control system 1420 and connected to control system 1420 via, e.g., a wired connection (e.g., an optical cable). However, in some other embodiments, radio unit 1425 and potentially the antenna 1430 are integrated together with control system 1420. Node processor 1405 operates to provide at least one function 1445 of radio access node 1400A as described herein. In some embodiments, the function(s) are implemented in software that is stored, e.g., in the memory 1410 and executed by node processor 1405.

In certain embodiments, some or all of the functionality described as being provided by a base station, a node B, an eNodeB, and/or any other type of network node may be provided by node processor 1405 executing instructions stored on a computer-readable medium, such as memory 1410 shown in FIG. 14A. Alternative embodiments of radio access node 1400 may comprise additional components to provide additional functionality, such as the functionality described herein and/or related supporting functionality.

Referring to FIG. 14B, a radio access node 1400B comprises at least one module 1450 configured to perform one or more corresponding functions. Examples of such functions include various method steps or combinations of method steps as described herein with reference to radio access node(s). In general, a module may comprise any suitable combination of software and/or hardware configured to perform the corresponding function. For instance, in some embodiments a module comprises software configured to perform a corresponding function when executed on an associated platform, such as that illustrated in FIG. 14A.

In one example embodiment, radio access node 1400B comprises an obtaining module configured to obtain information indicating an operational context of the LAT procedure, an adapting module configured to adapt at least one parameter of the LAT procedure according to the obtained information, and a controlling module configured to control at least the SN or the DN to communicate according to the LAT procedure having the adapted at least one parameter.

Figure 15:
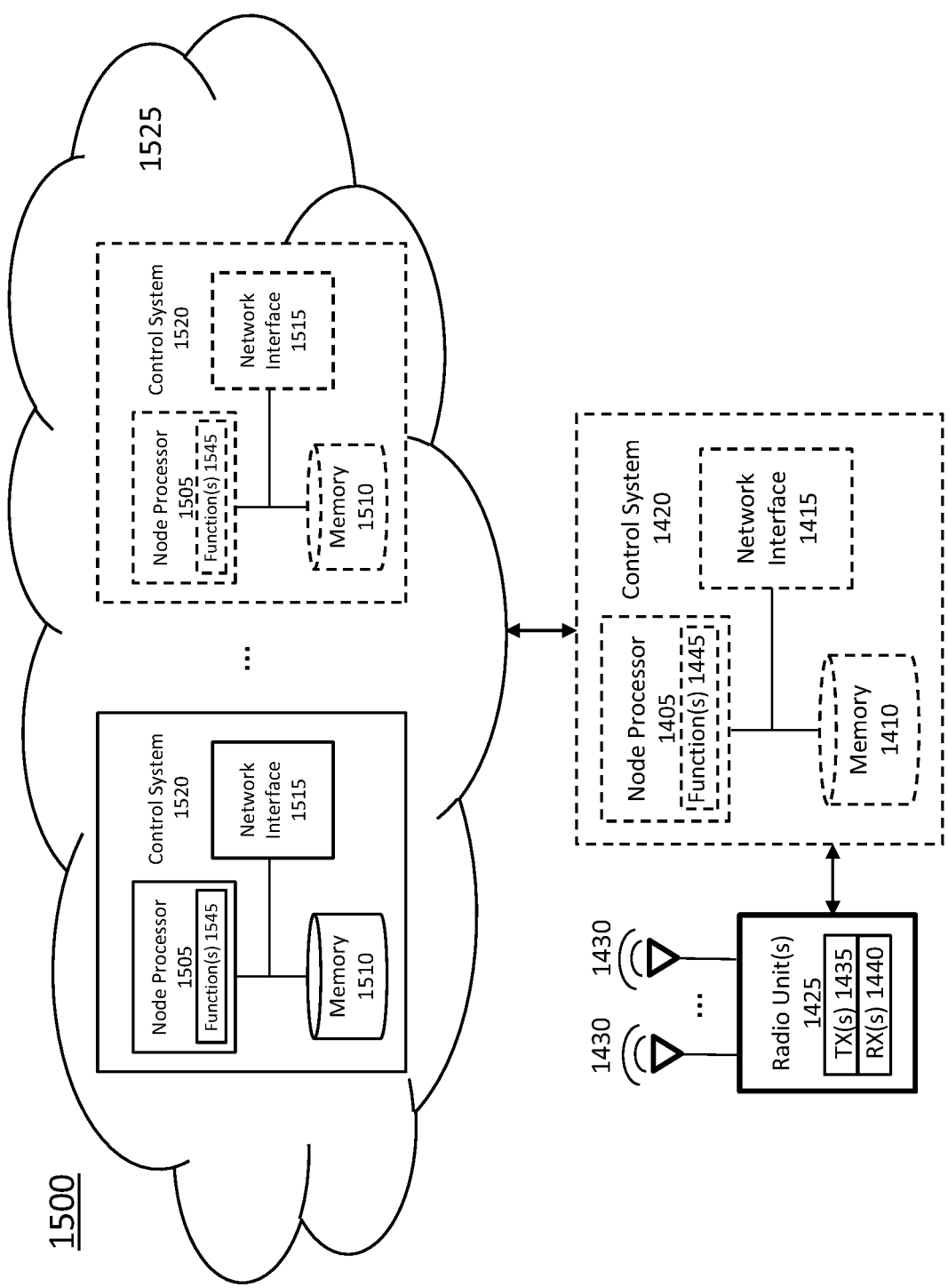
FIG. 15 illustrates a radio access node according to yet another embodiment of the disclosed subject matter.

FIG. 15 is a block diagram that illustrates a virtualized radio access node 1500 according to an embodiment of the disclosed subject matter. The concepts described in relation to FIG. 15 may be similarly applied to other types of network nodes. Further, other types of network nodes may have similar virtualized architectures. As used herein, the term "virtualized radio access node" refers to an implementation of a radio access node in which at least a portion of the functionality of the radio access node is implemented as a virtual component(s) (e.g., via a virtual machine(s) executing on a physical processing node(s) in a network(s)).

Referring to FIG. 15, radio access node 1500 comprises control system 1420 as described in relation to FIG. 14A.

Control system 1420 is connected to one or more processing nodes 1520 coupled to or included as part of a network(s) 1525 via network interface 1415. Each processing node 1520 comprises one or more processors 1505 (e.g., CPUs, ASICs, FPGAs, and/or the like), memory 1510, and a network interface 1515.

In this example, functions 1445 of radio access node 1400A described herein are implemented at the one or more processing nodes 1520 or distributed across control system 1420 and the one or more processing nodes 1520 in any desired manner. In some embodiments, some or all of the functions 1445 of radio access node 1400A described herein are implemented as virtual components executed by one or more virtual machines implemented in a virtual environment(s) hosted by processing node(s) 1520. As will be appreciated by one of ordinary skill in the art, additional signaling or communication between processing node(s) 1520 and control system 1420 is used in order to carry out at least some of the desired functions 1445. As indicated by dotted lines, in some embodiments control system 1420 may be omitted, in which case the radio unit(s) 1425 communicate directly with the processing node(s) 1520 via an appropriate network interface(s).

In some embodiments, a computer program comprises instructions which, when executed by at least one processor, causes at least one processor to carry out the functionality of a radio access node (e.g., radio access node 1210 or 1400A) or another node (e.g., processing node 1520) implementing one or more of the functions of the radio access node in a virtual environment according to any of the embodiments described herein.

As indicated by the foregoing, certain embodiments provide reconfiguration and adaptation mechanisms for an LAT procedure, which leads to efficient transmissions depending upon network size and topology, spectral interference, beamwidth of directional transmissions, traffic characteristics and the mobility patterns. The factors influencing the adaptation at run-time are captured by a weighting function, and can be tuned to the specific implementation. The reconfiguration includes the listening timings (both the listening interval and transmission period) in the LAT procedure, and the method for combing acknowledgement frames. Different embodiments are described to show how LAT procedure can exercise adaptation and reconfiguration, which leads to efficient transmissions.

The following is a list of acronyms that may be used in this written description.

ACK Acknowledgement
AP Access Point
ARQ Automated Repeat request
BO Backoff
CCA Clear Channel Assessment
CFP Contention Free Period
CW Contention Window
DCF Distributed Coordination Function
DIFS DCF Inter-Frame Spacing
DL Downlink
DRS Discovery Reference Signal
eNB evolved NodeB, base station
LAT Listen After Talk
LBT Listen-before-talk
MCS Modulation Coding Scheme NR New Radio (refers to the 5G radio interface)
QoS Quality of Service
RB Resource Block
RF Radio Frequency
SCell Secondary Cell
SIFS Short Inter-frame Spacing
STA Station
UE User Equipment
UL Uplink While the disclosed subject matter has been presented above with reference to various embodiments, it will be understood that various changes in form and details may be made to the described embodiments without departing from the overall scope of the disclosed subject matter.

The invention claimed is:

1. A method of controlling a listen-after-talk (LAT) procedure in a wireless communication network comprising at least one of a source node (SN) and a destination node (DN), comprising:
obtaining information indicating an operational context of the LAT procedure;
adapting at least one parameter of the LAT procedure according to the obtained information; and
controlling at least the SN or the DN to communicate according to the LAT procedure having the adapted at least one parameter.

2. The method of claim 1, wherein the operational context of the LAT procedure comprises at least one of a condition of a communication medium, traffic characteristics, a network topology, and past behavior of the LAT procedure.

3. The method of claim 1, wherein adapting the at least one parameter of the LAT procedure comprises adjusting a duration of a listening period to be employed by the SN after a transmission period.

4. The method of claim 3, wherein adjusting the duration of the listening period comprises increasing the listening period in consideration of relatively narrow beamwidth transmissions or relatively low channel contention, and decreasing the listening period in consideration of relatively wide beamwidth transmissions or relatively high channel contention.

5. The method of claim 1, wherein adapting the at least one parameter of the LAT procedure comprises adjusting a data frame size to be used for transmissions by the SN.

6. The method of claim 1, wherein adapting the at least one parameter of the LAT procedure comprises adjusting a transmission period to be used for transmissions by the SN.

7. The method of claim 1, wherein adapting the at least one parameter of the LAT procedure comprises adjusting a number of data frames to be transmitted by the SN during a transmission period.

8. The method of claim 1, wherein adapting the at least one parameter of the LAT procedure comprises adjusting a number of data frames to be transmitted per acknowledgement (ACK) frame.

9. An apparatus configured to control a listen-after-talk (LAT) procedure in a wireless communication network comprising at least one of a source node (SN) and a destination node (DN), comprising:
processing circuitry and memory collectively configured to:
obtain information indicating an operational context of the LAT procedure;
adapt at least one parameter of the LAT procedure according to the obtained information; and
control at least the SN or the DN to communicate according to the LAT procedure having the adapted at least one parameter.

10. The apparatus of claim 9, wherein the operational context of the LAT procedure comprises at least one of a condition of a communication medium, traffic characteristics, a network topology, and past behavior of the LAT procedure.

11. The apparatus of claim 9, wherein adapting the at least one parameter of the LAT procedure comprises adjusting a duration of a listening period to be employed by the SN after a transmission period.

12. The apparatus of claim 11, wherein adjusting the duration of the listening period comprises increasing the listening period in consideration of relatively narrow beamwidth transmissions or relatively low channel contention, and decreasing the listening period in consideration of relatively wide beamwidth transmissions or relatively high channel contention.

13. The apparatus of claim 9, wherein adapting the at least one parameter of the LAT procedure comprises adjusting a data frame size to be used for transmissions by the SN.

14. The apparatus of claim 9, wherein adapting the at least one parameter of the LAT procedure comprises adjusting a transmission period to be used for transmissions by the SN.

15. The apparatus of claim 9, wherein adapting the at least one parameter of the LAT procedure comprises adjusting a number of data frames to be transmitted by the SN during a transmission period.

16. The apparatus of claim 9, wherein adapting the at least one parameter of the LAT procedure comprises adjusting a number of data frames to be transmitted per acknowledgement (ACK) frame.

17. The apparatus of claim 9, wherein the information indicating the operational context of the LAT procedure comprises a metric determined by a weighted sum of factors including at least one of a condition of a communication medium, traffic characteristics, a network topology, and past behavior of the LAT procedure.

18. The apparatus of claim 17, wherein the processing circuitry and memory is collectively further configured to:
determine whether the metric exceeds a predetermined threshold; and
adapt the at least one parameter of the LAT procedure according to the obtained information, as a consequence of whether the metric exceeds the predetermined threshold.

19. The apparatus of claim 17, wherein the factors include the past behavior of the LAT procedure, as indicated by a prior value of the metric.

20. The apparatus of claim 9, wherein the method is performed by the SN.

* * * * *